Oct. 27, 1925.

W. J. WINNINGHOFF

SEALING DEVICE

Filed Jan. 6, 1920

1,558,524

Boro-Silicate Glasses

Boro-Silicate Glasses

INVENTOR
Wilford J. Winninghoff
BY
Thos. H. Brown
his ATTORNEY

Patented Oct. 27, 1925.

1,558,524

UNITED STATES PATENT OFFICE.

WILFORD J. WINNINGHOFF, OF EAST ORANGE, NEW JERSEY, ASSIGNOR TO COOPER HEWITT ELECTRIC COMPANY, OF HOBOKEN, NEW JERSEY, A CORPORATION OF NEW JERSEY.

SEALING DEVICE.

Application filed January 6, 1920. Serial No. 349,815.

*To all whom it may concern:*

Be it known that I, WILFORD J. WINNINGHOFF, a citizen of the United States, and resident of East Orange, county of Essex, State of New Jersey, have invented certain new and useful Improvements in Sealing Devices, of which the following is a specification.

My invention relates to hermetic juncture devices for vitreous materials and has for its object to provide a device having a maximum of three steps between the extreme members, and which shall be simple in construction and highly effective in operation.

In my work on electric devices having quartz containers, the object of my invention has been accomplished by utilizing as the first step or zone a vitreous material having a proper combination of coefficients of expansion and melting point permitting the sealing thereof to quartz; the second step or zone being a vitreous material having a proper combination of coefficient of expansion and melting point permitting the sealing thereof to the first named step; the third step or zone being a vitreous material having a proper combination of expansion and melting point permitting the sealing thereof to the material of the second step and to a leading-in wire of tungsten, for example, if the latter is desired.

I have illustrated my invention as applied to a mercury vapor lamp having a quartz container, but it will be understood that my invention is not limited to this particular use, is useful in the arts generally as an hermetic juncture, and is applicable to any device in the art having a container of material of relatively low coefficient of expansion where an hermetic seal is essential.

Figure 1:
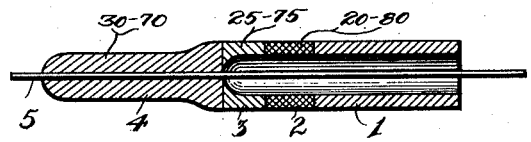
Figure 3:
Figure 2:
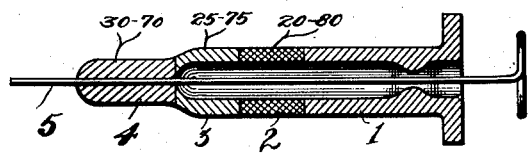
Figure 4:
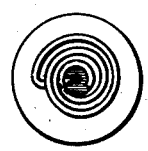

The present invention is illustrated in the accompanying drawings in which Figure 1 is a vertical section of my tungsten to quartz seal for vapor lamps having liquid electrodes; and Figure 2 is a vertical section of the same as applied to the solid anode type of lamp. Fig. 3 is an end view of the seal illustrated in Fig. 1. Fig. 4 is an end view of the seal illustrated in Fig. 2.

In the drawings, 1 is the quartz wall of a mercury vapor lamp, for example, having sealed thereto a boro-silicate glass, 2, of approximately 20—80 composition. At 3 is shown a glass sealed to the member 2, this glass being a boro-silicate glass of say in the neighborhood of 25—75 composition, and at 4 is shown a glass sealed to the member 3, the glass 4 being a boro-silicate glass in the neighborhood of 30—70 composition, the last named glass having a coefficient of expansion and a melting point permitting the sealing thereof to the member 3 and to a tungsten lead-in wire, 5.

While I have described the glasses of the various zones as boro-silicate glasses, it is to be understood that the composition of said glasses can be varied from that given above and contain, if desired, inappreciable amounts of other constituents, either acidic, neutral, or basic, for varying the coefficients of expansion or the melting points of any of the compositions, within the natural limits of quartz to tungsten, without departing from my invention.

I claim as my invention:

1. An hermetic junction between walls of vitreous material having thermal expansion co-efficients between those of quartz and tungsten comprising a boro-silicate vitreous material having a composition of approximately 20—80, another boro-silicate vitreous material having a composition in the neighborhood of 25—75, and fused in juncture to the first named vitreous material, and another boro-silicate vitreous material having a composition in the neighborhood of 30—70 and fused in juncture to the second named vitreous material.

2. An hermetic seal comprising a wall of quartz, a leading-in conductor of tungsten and three steps of boro-silicate glasses, the first having a composition of approximately 20—80, the second having a composition in the neighborhood of 25—75 and the third having a composition in the neighborhood of 30—70, all hermetically fused in juncture to the said tungsten conductor and the quartz wall.

Signed at Hoboken in the county of Hudson and State of New Jersey this 18th day of December A. D. 1919.

WILFORD J. WINNINGHOFF.